United States Patent [19]
Ahmadi et al.

[11] Patent Number: 5,384,777
[45] Date of Patent: Jan. 24, 1995

[54] ADAPTIVE MEDIUM ACCESS CONTROL SCHEME FOR WIRELESS LAN

[75] Inventors: Hamid Ahmadi, Somers; David F. Bantz, Chappaqua, both of N.Y.; Frederic J. Bauchot, LaTourraque Saint-Jeannet, France; Arvind Krishna, Briarcliff Manor, N.Y.; Richard O. La Maire, Yorktown Heights, N.Y.; Kadathur S. Natarajan, Millwood, N.Y.

[73] Assignee: International Business Machines Corporation, Armonk, N.Y.

[21] Appl. No.: 49,052

[22] Filed: Apr. 19, 1993

[51] Int. Cl.⁶ .................... H04J 3/26; H04L 5/22
[52] U.S. Cl. ................ 370/85.2; 370/95.3; 370/110.1
[58] Field of Search ........... 370/60, 61, 79, 80, 370/81, 82, 85.6, 85.7, 85.2, 85.3, 94.1, 95.1, 95.3, 110.1; 340/825.08, 825.5, 825.52

[56] References Cited

U.S. PATENT DOCUMENTS

| | | | |
|---|---|---|---|
| 4,679,187 | 7/1987 | Irvin | 370/85.7 X |
| 4,747,101 | 5/1988 | Akaiwa et al. | 370/85.6 |
| 4,907,224 | 3/1990 | Scoles et al. | 370/85.2 |
| 5,012,469 | 4/1991 | Sardana | 370/85.2 X |
| 5,040,175 | 8/1991 | Tuch et al. | 370/85.2 |
| 5,123,029 | 6/1992 | Bantz et al. | 375/1 |
| 5,241,542 | 8/1993 | Natarajan et al. | 370/85.2 X |

OTHER PUBLICATIONS

Lawrence G. Roberts, "Dynamic Allocation of Satellite Capacity Through Packet Reservation", Nat. Comput. Conf. AFIPS Conf. Proc. vol. 42, pp. 711–716, Jun. 1973.

Stephen S. Rappaport, "Demand Assigned Multiple Access Systems Using Collision Type Request Channels: Traffic Capacity Comparisons", IEEE Trans. on Communications, vol. com–27, No. 9, Sep. 1979, pp. 1325–1331.

"Efficiency of Packet Reservation Multiple Access" D. J. Goodman IEEE Trans. on Vehicular Techn. vol. 40 No. 1 Feb. 1991 pp. 170–176.

"Medium Access Control Protocol for Wireless LANS" K. S. Natarajan et al, DOC:IEEE p. 802.11/92-93, pp. 1–23.

*Primary Examiner*—Melvin Marcelo
*Attorney, Agent, or Firm*—Perman & Green

[57] ABSTRACT

A Medium Access (MAC) Protocol is utilized for wireless radio access for a plurality of remote stations to a base station on a LAN. There is a time division fixed frame structure in which time is slotted, and time slots are grouped into fixed frames consisting of data and control subframes or periods. The fixed frame structure consists of three periods (A, B, and C) along with their respective headers. The first period, the A period, is used exclusively for data transfer from the base station to the remote stations. The following period, the B period, is used for contention-free data transfer from the remote stations to the base station. The allocation of the data slots in the A and B periods is performed by the base station. The last period of the frame, designated as the C period, is used for the transmission of reservation requests and data from the remote stations to the base station in a random-access contention mode using a slotted Aloha protocol. The duration of the three periods may be varied using a movable boundary technique.

50 Claims, 11 Drawing Sheets

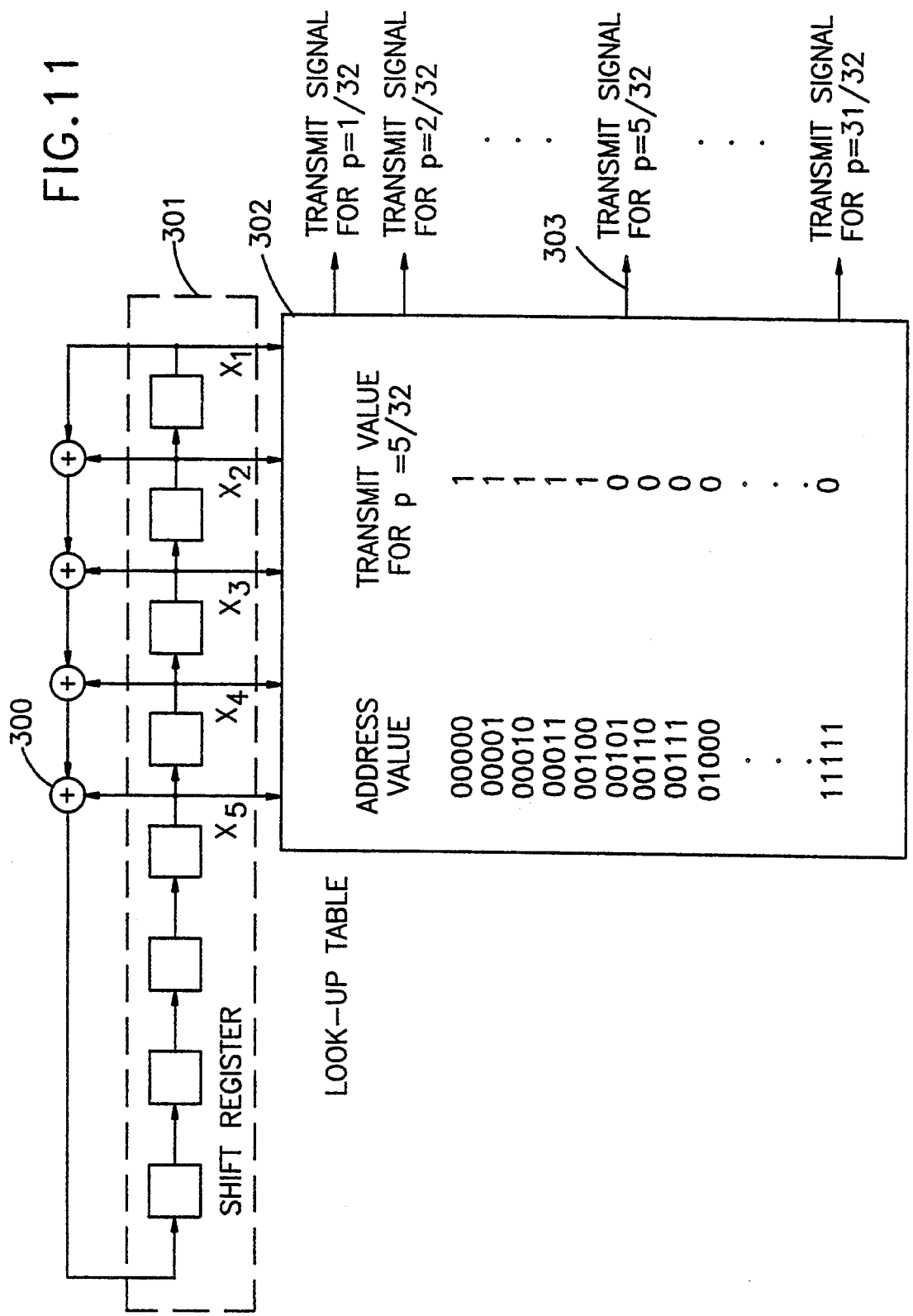

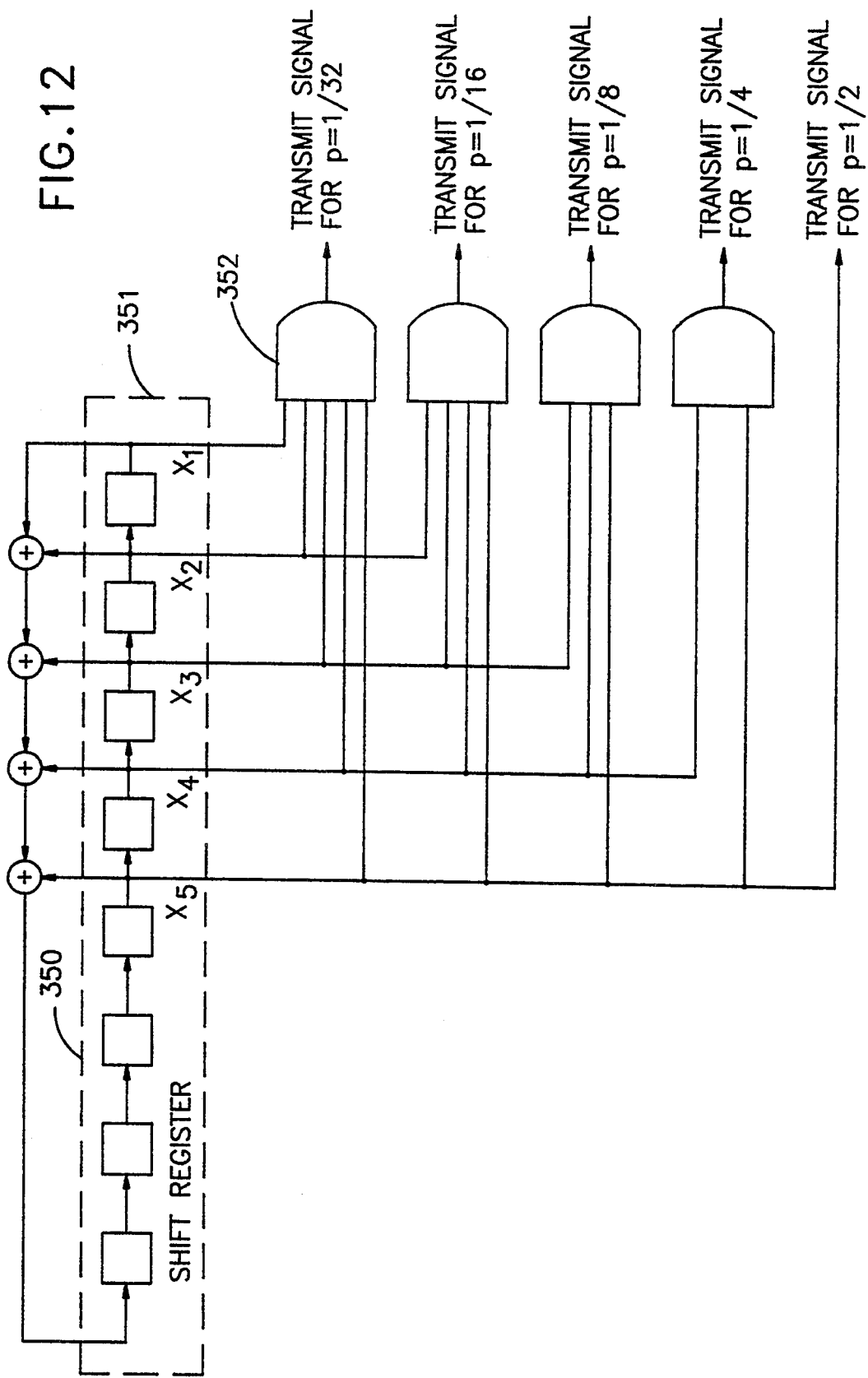

ADAPTIVE MEDIUM ACCESS CONTROL SCHEME FOR WIRELESS LAN

FIELD OF THE INVENTION

This invention relates generally to data communications utilizing Local Area Networks (LAN.) More specifically, this invention is directed to a Medium Access Control (MAC) protocol for wireless access in a LAN.

BACKGROUND OF THE INVENTION

The need for personal wireless communications is expanding rapidly with the advances in digital communications and personal communications systems. The progress in cellular radio technology and the growth rate of the cellular telephone systems over the last years is indicative of tremendous market demand for location independent communication via wireless access. Many of the current wireless networks architectures are primarily designed and optimized for voice communications and wide area coverage. With the proliferation of personal and portable computers, and local area networks, it is envisioned that data services and applications such as file server access, client-server execution, and electronic mail will require wireless access in the LAN environment supporting distributed computing. Since the characteristics and profile of data traffic are very different from those of voice traffic, the wireless access protocol must efficiently accommodate the very dynamic and bursty nature of data traffic.

U.S. Pat. No. 4,907,224 to Scoles et al discloses a method for transmitting data in packet switching networks which provides a Collision-Eliminating Multiple Access protocol in which nodes desiring to transmit over the network channel transmit reservation requests during a plurality of contention slots, the number of contention slots being dynamically controlled according to network load. The node designated to next obtain control of the channel receives the identifiers of nodes transmitting reservation requests and, prior to transmitting application data, transmits network control data consisting of the identifiers of nodes from whom reservation requests were successfully received. The transmitted identifiers are received and stored by each node in an identical queue whereby subsequent control of the channel is rotated based on the order of node identifiers appearing on each node. The transmitted network control data includes reservation requests received during a previous contention slot period, queue correction information, and the identifiers of nodes from which the controlling node expects to receive data.

U.S. Pat. No. 5,123,029 to Bantz et al which is assigned to the assignee of this invention, discloses a hybrid controlled access and random access scheme using frequency hopping spread spectrum communication techniques implemented in an indoor digital data radio communication system between mobile stations and a computer system. A hop in the frequency hopping spread spectrum communication system is subdivided into two intervals so that different media-access protocols can be used in each interval. The protocol uses a centralized control scheme in one interval and a decentralized scheme in the other, interval; and the intervals may be varied depending on the load of the system. U.S. Pat. No. 5,123,029 is incorporated herein by reference. L. G. Roberts, "Dynamic Allocation of satellite capacity through packet reservation", Nat. Comput. Conf. AFIPS Conf. Proc. Vol. 42, pp. 711–716, June 1973, describes a proposal for a MAC protocol based on a reservation scheme for user data traffic and a contention scheme for making reservations.

According to the present invention, an adaptive and efficient Medium Access Control (MAC) protocol for wireless access in a local area environment is capable of supporting both bursty data traffic and synchronous services such as voice and video. A packet-switched architecture is utilized in which several mobile remote stations within a given cell (small cells covering a range of a few hundred meters) communicate with a base station using radio channels, which can be connected to a fixed local area network. Remote stations can operate both indoor and outdoor with limited range and have wireless access to the base stations on the backbone network. As an example, consider the environment of an industrial campus consisting of several office buildings. The buildings are divided into cells, and cells are connected via some backbone network such as wired LAN. This invention addresses the intra-cell multiaccess problem. The basic problem here is how to coordinate the wireless channel bandwidth which is shared by all mobile stations within a cell in a fair, flexible demand-driven manner and achieve a high throughput.

DISCLOSURE OF THE INVENTION

A Medium Access Control (MAC) Protocol for wireless radio access for a plurality of remote stations to a base station on a LAN is disclosed. The MAC protocol is based on a reservation scheme for user data traffic and a random access technique for control and signalling traffic. There is a time division fixed frame structure in which time is slotted, and time slots are grouped into fixed frames consisting of data and control subframes or periods. The fixed frame structure consists of three periods (A, B, and C) along with their respective headers. The first period, the A period, is the outbound channel which is used exclusively for data transfer from the base station to the remote stations. The following period, the B period, is the inbound channel that is used for contention-free data transfer from the remote stations to the base station. The allocation of the data slots in the A and B periods is performed by the base station. The last period of the frame, designated as the C period, is the control channel used for the transmission of reservation requests and data from the remote stations to the base station in a random-access contention mode using a slotted Aloha protocol. The duration of the three periods may be varied using a movable boundary technique. The base station estimates the number of actively transmitting remote stations utilizing feedback information from the remote stations. This estimate is broadcast to the remote stations as control indica to control their transmission attempts in the C period, thus yielding high transmission efficiency.

BRIEF DESCRIPTION OF THE DRAWINGS

FIGS. 11 and 12 are each schematic diagrams of a Bernoulli random variable generator as used in the practice of the invention.

DESCRIPTION OF THE PREFERRED EMBODIMENT

A MAC protocol is described that is based on a reservation scheme for user data traffic and a random access technique for the control and signaling traffic. The proposed scheme is based on a time division frame structure. Time is slotted, and time slots are grouped into fixed frames consisting of data and control subframes. The data channel is also divided into two segments one for the inbound (remote stations to base station) and the other for the outbound (base station to remote) transmissions. The motivation for using the reservation scheme for data transmission is described below.

The nature of user traffic could be very bursty, unpredictable and highly correlated, therefore, reserving bandwidth on demand would accommodate a superior grade of service and performance. Since radio channels have a higher error rate than a typical wired channel, it is necessary to transmit small packets over the wireless link. Therefore a user data message must be fragmented into small packets for the wireless link. This implies that a single user message or request may result in a group of wireless packets that need to be transmitted with a minimum delay.

Stream-like traffic such as voice and video require guaranteed bandwidth for synchronous transmission.

The invention includes the following features
 1. A random access control channel which is used for reservation requests and a demand-driven reservation-based data channel, one for inbound and one for outbound.
 2. A unified scheme for support of bursty interactive data and stream like synchronous traffic.
 3. Small contention slots to accommodate more users and achieve higher throughput.
 4. A technique for flexibly and dynamically adjusting frame boundaries between control and data channels as well as between inbound and outbound channels to achieve maximum throughput.
 5. An adaptive state-dependent random-access transmission scheme for the control channel to achieve maximum throughput using a real-time estimation technique.
 6. A simple Bernoulli random variable generator that is computationally efficient.

Figure 1:
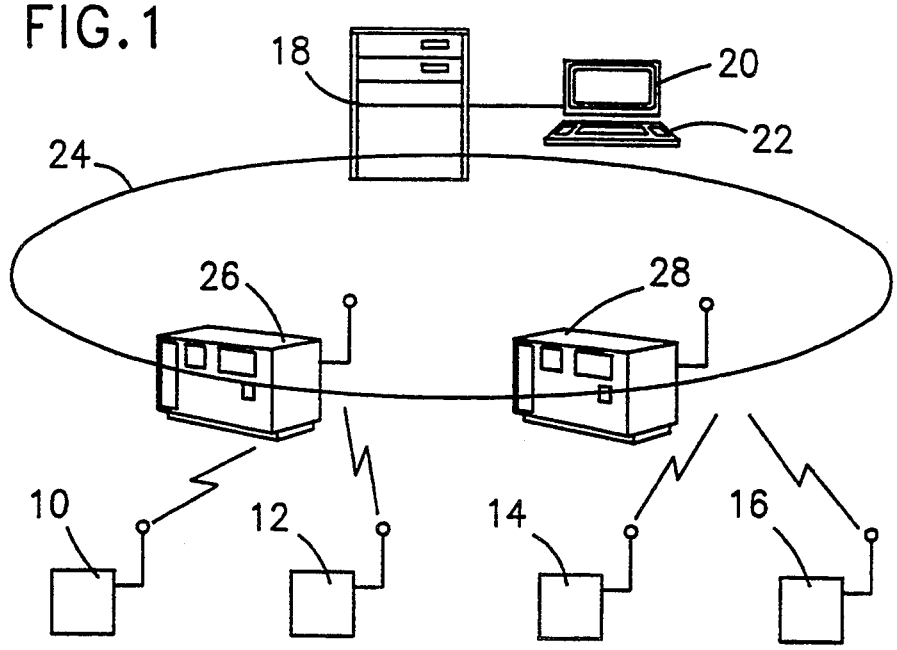
FIG. 1 is a pictorial diagram showing an indoor radio digital data communication system of the type in which the invention is implemented.

Referring now to the drawings, and more particularly to FIG. 1, there is shown an indoor radio system allowing communication between a plurality of mobile stations 10, 12, 14, and 16 and applications and data residing in a computing system. The computing system typically includes a Wireless Network Manager (WNM) or Wireless Network Controller 18, with attached monitor 20 and keyboard 22, of a local area network (LAN), generally indicated by reference numeral 24, having a plurality of attached workstations or personal computers (not shown for simplicity). Also attached to the LAN are one or more gateways 26 and 28 with which the mobile stations 10, 12, 14, and 16 communicate. These gateways, referred to as base stations, are augmented according to the invention to provide certain radio system management functions which coordinate the mobile stations' access to the common radio channel. Communications between mobile stations is supported via relay through the base stations 26 and 28.

Figure 1A:
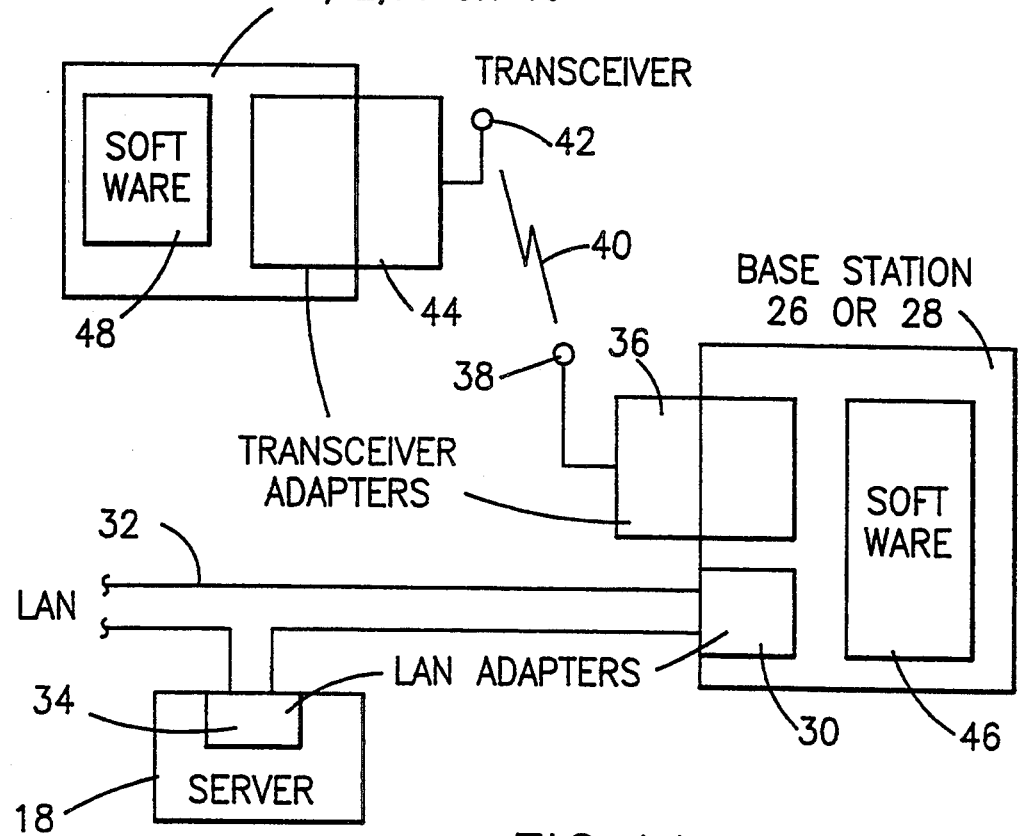
FIG. 1A is a block diagram of the system shown in FIG. 1 illustrating the basic components of a mobile station and a base station.

As shown in more detail in FIG. 1A, a base station 26 or 28, which may be a conventional microcomputer, has a LAN adapter 30 inserted in a bus slot and connected to LAN cabling 32. The WNM 18, typically is also a conventional microcomputer and includes one or more direct access storage devices (DASDs) such as hard disks (not shown). The WNM 18 also has a LAN adapter 34 inserted in a bus slot, the LAN adapter 34 is connected, to LAN cabling 32. The LAN adapters 30 and 34 and the LAN cabling 32 together with LAN software constitute the LAN 24. The LAN 24 is of conventional design and does not formpart of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote or mobile stations, 10, 12, 14, or 16. The mobile station may itself be a hand held or lap top computer of conventional design which, like the base station, is provided with an antenna 42 and a transceiver adapter 44. The transceiver adapter 44 is also implemented as a printed circuit card which is inserted in a bus slot of the computer. The transceiver adapter 44, like transceiver adapter 36, includes a spread spectrum transceiver of similar design. The base station and the mobile stations are further provided with software, generally indicated by reference numerals 46 and 48, respectively, which support their respective transceiver adapters.

Figure 2:
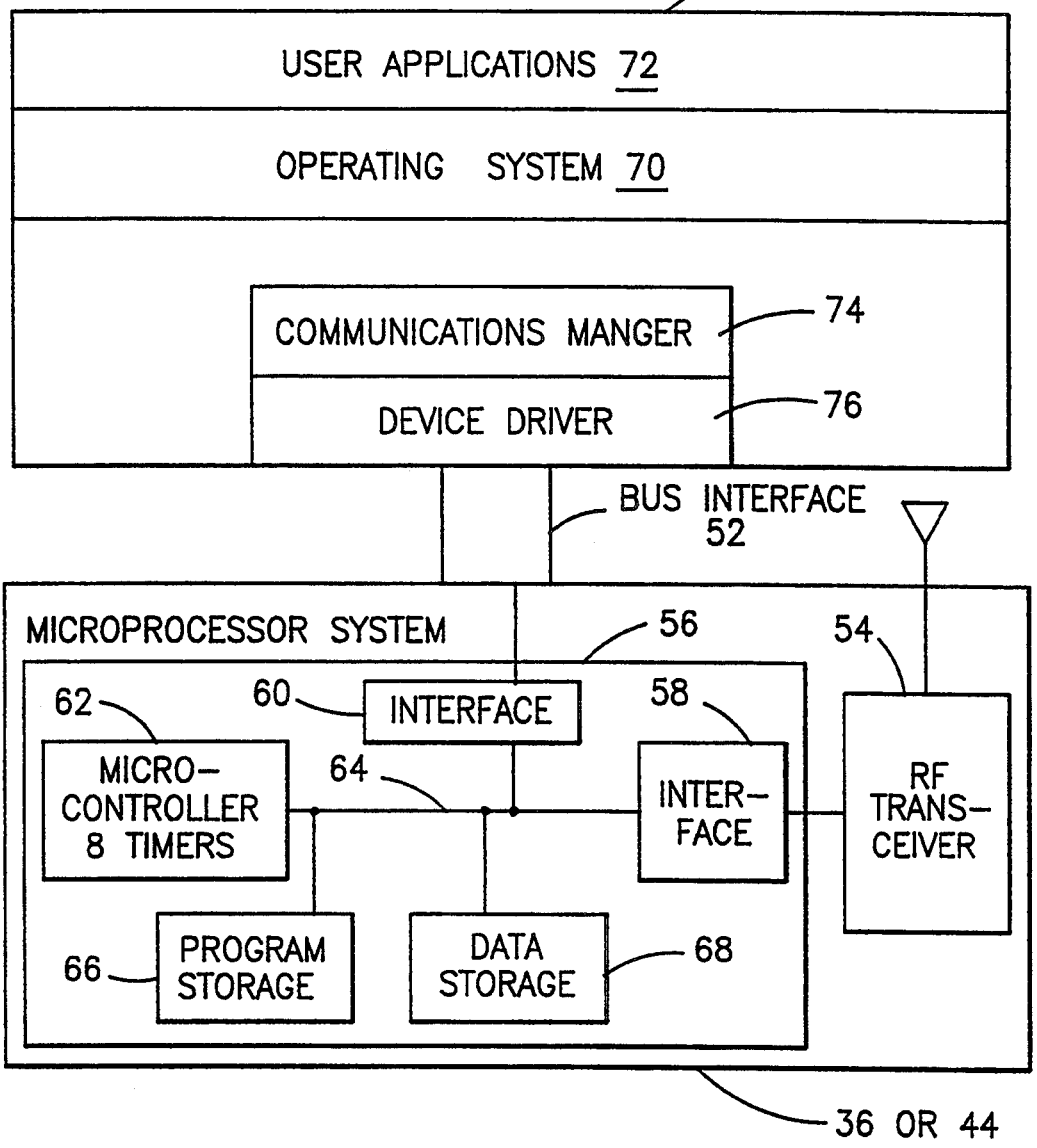
FIG. 2 is a block diagram of the radio system used in the implementation of a preferred embodiment of the invention.

FIG. 2 shows the radio system common to both the mobile stations and the base stations of FIG. 1. The radio system includes a transceiver adapter 36 or 44 connected to the computer 50 via the computer's bus interface 52. The transceiver section is itself divided into an RF transceiver 54 (which may be a commercially available spread spectrum transceiver), and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems.

Microprocessor 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for example, Mischa Schwartz, *Telecommunication Networks: Protocols, Modeling and Analysis*, Addison-Wesley (1988).

When a packet is received through the RF transceiver 54, the serial channels check the packet destination address, check for errors, and deserialize the packet to data storage 68. The serial channels must have the capability to recognize a specific adapter address as well as a broadcast address. Specific microprocessors with appropriate serial channel and timer facilities include the Motorola 68302 and the National HPC46400E microprocessors.

The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

Protocol System Description

Figure 3:
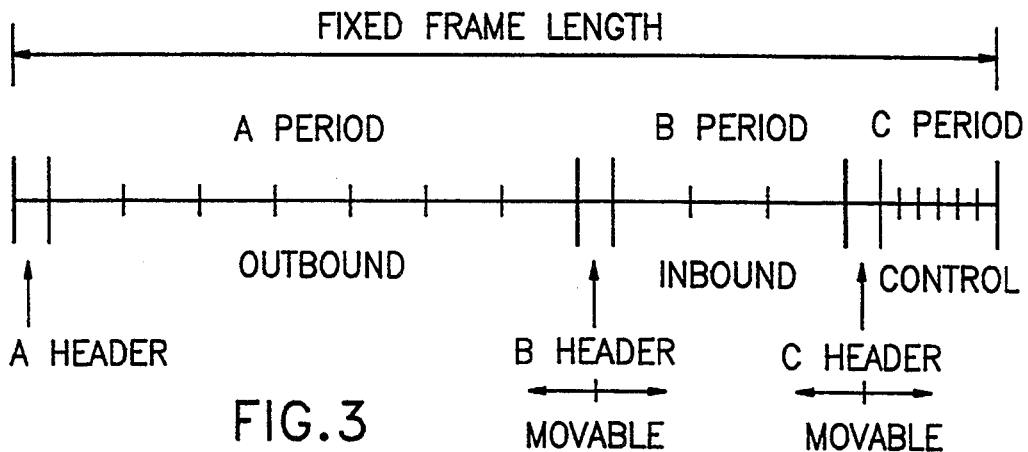
FIG. 3 is a diagram of the frame structure of the MAC protocol according to the invention.

The fixed frame structure consists of three periods (A, B, and C) along with their respective headers as is shown in FIG. 3. The first period, designated as the A period, is the outbound channel which is used exclusively for data transfer from the base station to the remote stations. The following period, designated as the B period, is the inbound channel that is used for contention-free data transfer from the remote stations to the base station. The allocation of the data slots in the A and B periods is performed by the base station. The last period of the frame, designated as the C period, is the control channel used for the transmission of reservation requests and data from the remote stations to the base station in a random-access mode using a slotted Aloha protocol. A finite number of remote stations contend on the control channel to make requests for a number of slots (corresponding to one user message) on the outbound or inbound data channel. The slot sizes in the A and B periods are equal and each accommodates one wireless data packet. The slots in the C period are typically much smaller and are referred to as mini-slots. Each such mini-slot accommodates one control packet. The use of mini-slots for the control channel yields higher efficiency both in terms of the number of users that can be supported and bandwidth utilization, than if full sized slots were used. This is because the contention channel achieves a throughput of about 37% in slotted Aloha (i.e., a wastage of 63%) whereas the A and B periods always have 100% utilization. Thus, the only bandwidth wastage occurs in the control channel so wastage is minimized in the invention by making the C slots small.

Each period has a header section in which it carries access control information as is shown in FIG. 3. The A header is the time interval during which the base station broadcasts a message to all of the remote stations that signals the beginning of the A period. This header also contains the length of the A period, the outbound slot allocation schedule and control information for the physical layer.

The B header is the time interval during which the base station broadcasts a message signalling the end of the A period and the beginning of B period. It also contains the length of the B period and additional control information. In particular, a slot allocation schedule is specified in the B header so that each remote station will know when to transmit in the B period.

Similar to the A and B headers, the C header signals the end of the B period and the beginning of the C period. The C header also contains the length of the C period and other control information concerning the probability of transmission that will be used by the remote stations for the C period of the frame. In the C period, any remote station may contend for the channel and transmit a message without an explicit allocation from the base station. The contention scheme is based on a slotted Aloha protocol such that each of the finite number of remote stations attempts to transmit in a given mini-slot (i.e., a C slot) with some probability p. The stochastic decision to transmit or not is made independently at each of the remote stations. If at most one remote station attempts to transmit in a slot, then that station has successfully contended for transmission. If more than one station attempts transmission in a slot, then the transmissions will collide, and each station will try to retransmit in the next C slot with the same probability p. The value of this probability is adaptive and it may be changed from one frame to another by the base station. An estimation algorithm for adapting this p value is described later. As mentioned above, the base station informs (using the C header) all of the remote stations about the new value of p at the beginning of the C period. Since collisions cannot be detected, an acknowledgement message is used to signify the correct reception of a packet. Therefore, all packet transmissions must be acknowledged either individually or as a group.

Period C is used for the following types of information

1. Registration requests that enable remote stations to identify themselves and request the services of the base station.
2. Requests for transmission time in the B period.

The transmission time requests can be either for synchronous or asynchronous services. Here, by synchronous service is implied establishment of a connection that requires guaranteed bandwidth for a sustained period of time. When a remote station transmits a reservation request, it identifies the type of service it requires plus the number of slots for asynchronous service or the bandwidth for the synchronous service. The base station schedules the allocation of slots and transmits the map of the schedule to each remote station. For the asynchronous traffic, slots are allocated in each frame for the duration of the connection. These slots can be positioned anywhere within a frame. For the synchronous traffic, slots are reserved in the first available frame, and in the following frames, for the requested allocation. The reservation requests can also be piggy-backed on the first data packet in order to reduce contention on the control channel. The base station ensures the scheduling of all received requests.

Operation at the Base Station

Figure 4:
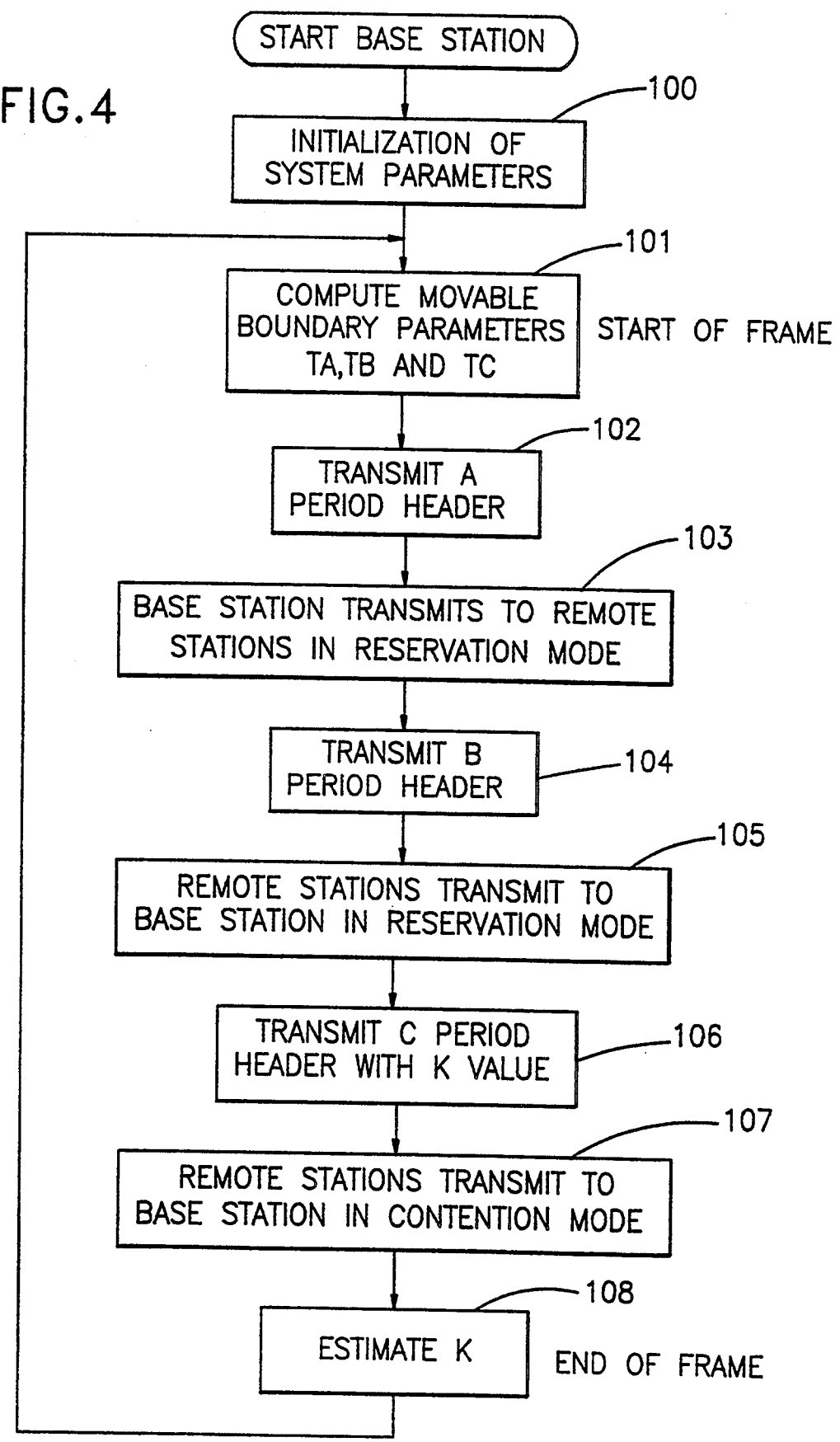
FIG. 4 is a flow chart of the logic followed by a base station in the MAC protocol of the invention.

An overview of the logic followed by a base station is shown in FIG. 4. When the base station is powered on, it executes an initialization procedure at block 100.

At the beginning of a frame, as shown at block 101, the base station may have packets for outbound transmission to a set of remote stations. If there is no outbound data, then parameter TA is set to 0. If outbound packets are to be transmitted to a remote station V, then the A period header at block 102 will include <V,Out(V)>, where Out(V) is the number of packets that V will receive in the current frame. TA is set equal to the total number of outbound packets that will be transmitted in the current frame. The base station then transmits to remote stations in a reservation mode at block 103.

At the beginning of each frame, the base station may have a set of pending bandwidth reservation requests for inbound data transfer (from remote stations to the base station). If the set of pending requests is empty, then parameter TB (block 101) is set to 0. Otherwise, the base station attempts to grant as many of the reservation requests as is possible. If remote station V is granted In(V) slots in the current frame, then the B period header is transmitted at block 104 and will include <V,In(V)>. TB is set equal to the total number of inbound slots that have been allocated. At block 105, remote stations transmit to a base station in a reservation mode.

At the beginning of the C period, the base station transmits at block 106 the current estimate K of the number of active remote stations as well as TC, the length of the C period. When remote stations transmit at block 107 using the slotted Aloha protocol in the C period, the base station obtains control information from the header of each packet that is successfully received. This control information is a single bit called a retry bit, which indicates whether or not the packet has been retried. That is, has the packet been retransmitted due to collision or noise during its first transmission attempt. The retry bit is used by an estimation procedure in block 108 that is run in the base station to revise its estimate of K. The method used to estimate K is described in detail in a later section. At the conclusion of the C period, the base station returns to the steps of computing the lengths of the three intervals for the next frame at block 101.

Operation at the Remote Station

Figure 5:
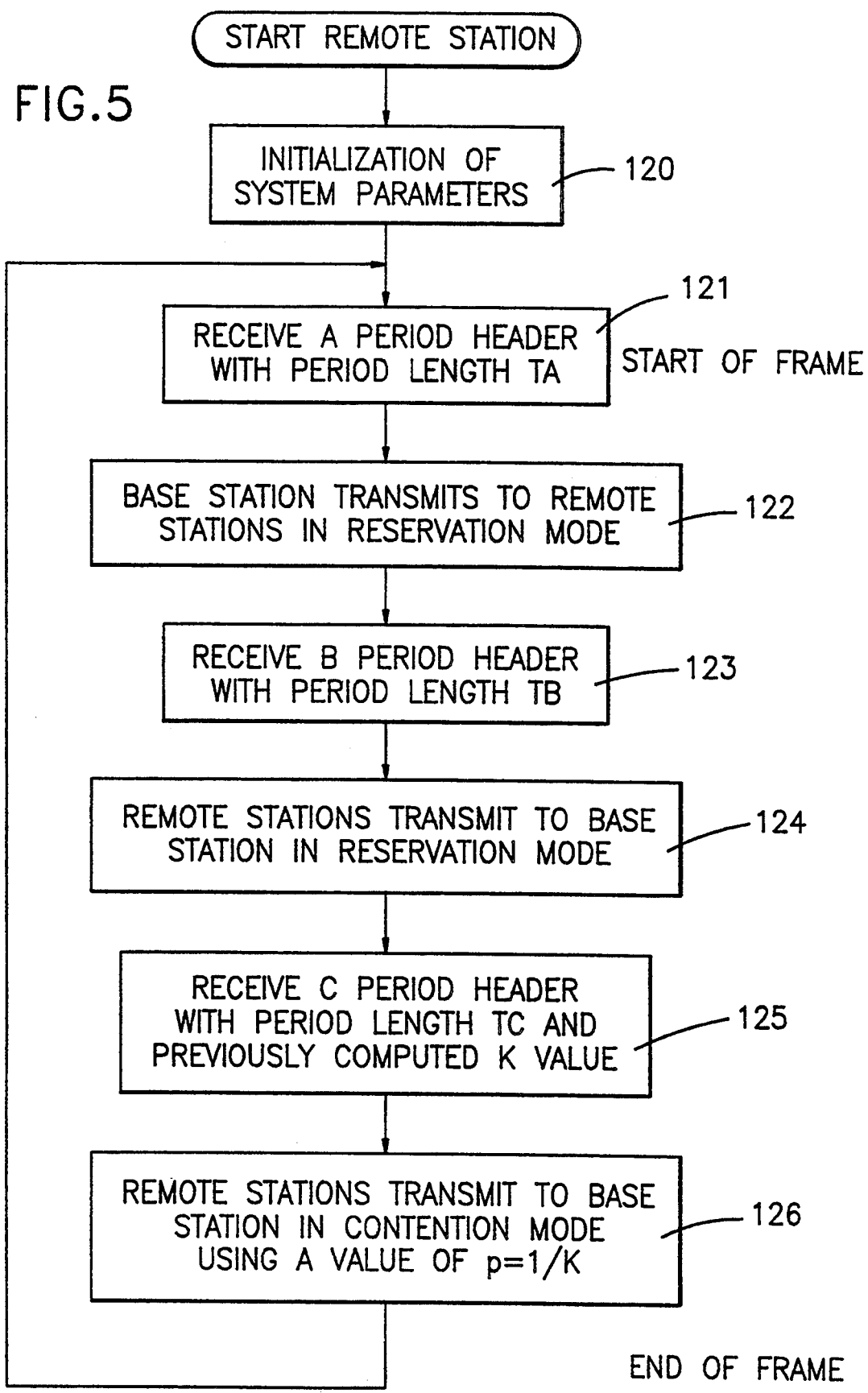
FIG. 5 is a flow chart of the logic followed by a remote station in the MAC protocol of the invention.

An overview of the logic followed by a remote station is shown in FIG. 5. When the remote station is powered on, it executes an initialization procedure at block 120 and sets a set of internal parameters. Then, it obtains synchronization with the base station and starts listening to the header messages of a frame.

At the beginning of a frame, a remote station, S, receives the A period header at block 121 and extracts TA, the length of the A period. It sets a timer for duration TA. It receives all packets broadcast by the base station that are addressed to it. At block 122, the base station transmits to the remote stations in a reservation mode.

At the end of the A period, the timer elapses and the remote station receives the B period header at block 123. It extracts TB, the length of the B period and sets a timer for duration TB. If a remote station has slots allocated to it, then it transmits to the base station at its designated time at block 124.

At the end of the B period, the timer elapses and the remote station receives the C period header at block 125. It extracts TC, the length of the C period and sets a timer for duration TC. It also learns about K and computes p=1/K, the probability for transmission in a C period slot. In the C period, the remote station follows the slotted Aloha protocol for transmitting to the base station in a contention mode. When the timer elapses, the current frame is finished and the remote station returns to the step of listening for the A period header of the next frame at block 121.

Boundary Adjustment Method

An adaptive method is used to adjust the lengths of the three periods, A, B, and C, of the protocol so as to rapidly adapt the sizes of the three periods of the frame according to changes in the traffic conditions. The lengths of the three periods are computed by the base station at the beginning of the frame and transmitted to all the remote stations in the A period header. The lengths of periods B and C are also included in the headers of their respective periods transmitted by the base station. The choices are designed to achieve a desirable throughput in each of the three periods.

The three main goals of the method are described below. Priority is given to the outbound traffic (period A). Since traffic is generated by reservation requests originating from the remote stations, by giving priority to the outbound traffic the outstanding requests can be completed before more requests enter the system. A minimum bandwidth is preserved for the inbound traffic (period B) to help prevent starvation of the inbound channel. Finally, a minimum bandwidth is preserved for the C period to provide good performance for the control channel and to ensure that when a new remote station enters the base station's cell, it will find a non-zero C period in which to perform registration.

The method must comply with the following constraint, which is dictated by the system description given earlier. Assume that the slots in the A and B periods are of the same size and that the ratio of these regular-sized slots to the mini-slots of the C period is R:1, then TA+TB+TC/R=TF where TA, TB and TC are the number of slots in the A, B and C periods, respectively, and where TF is the frame size divided by the size of an A or B slot.

Figure 6:
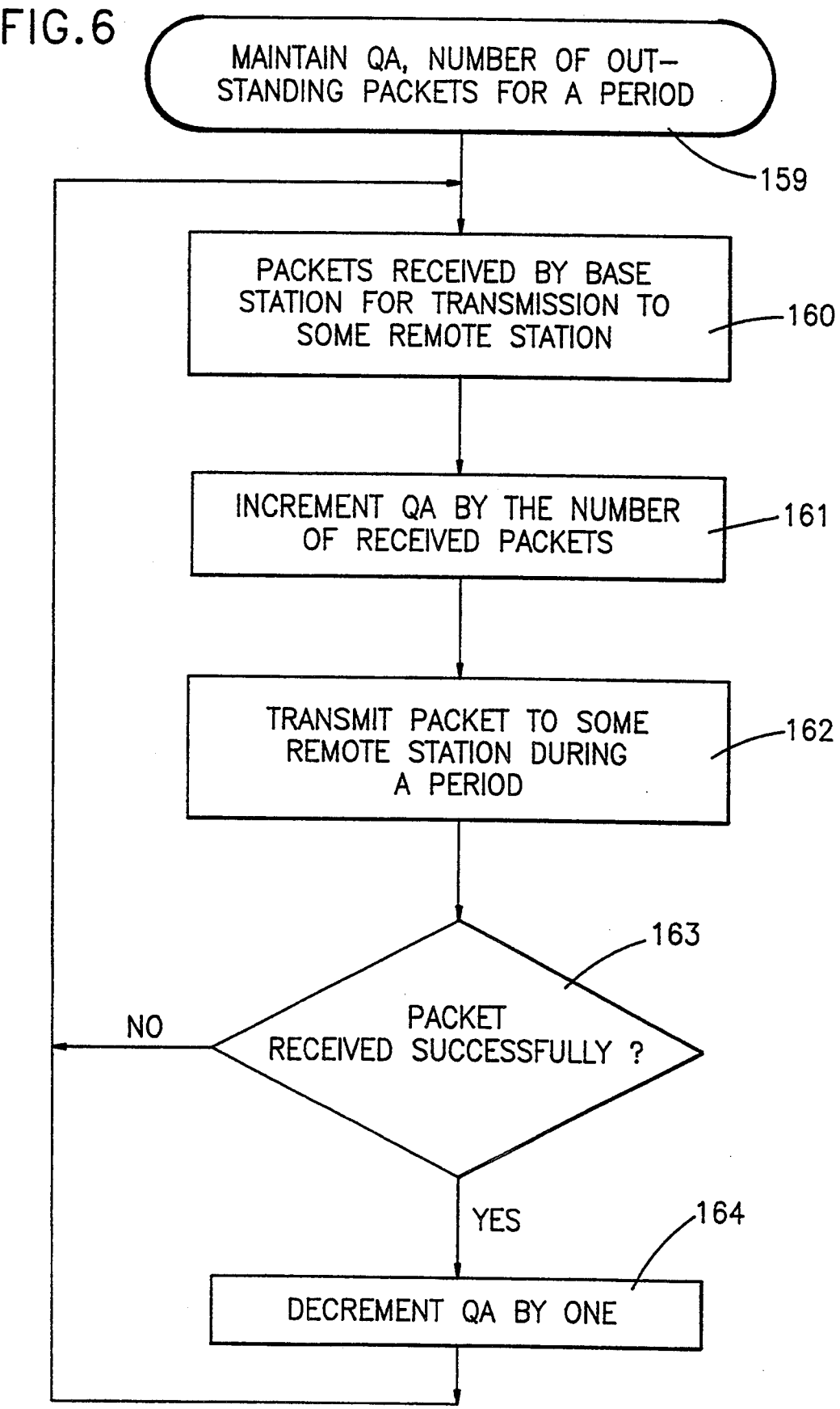
FIG. 6 is a flow chart for computing the number of outstanding packets for period A of the MAC protocol.
Figure 7:
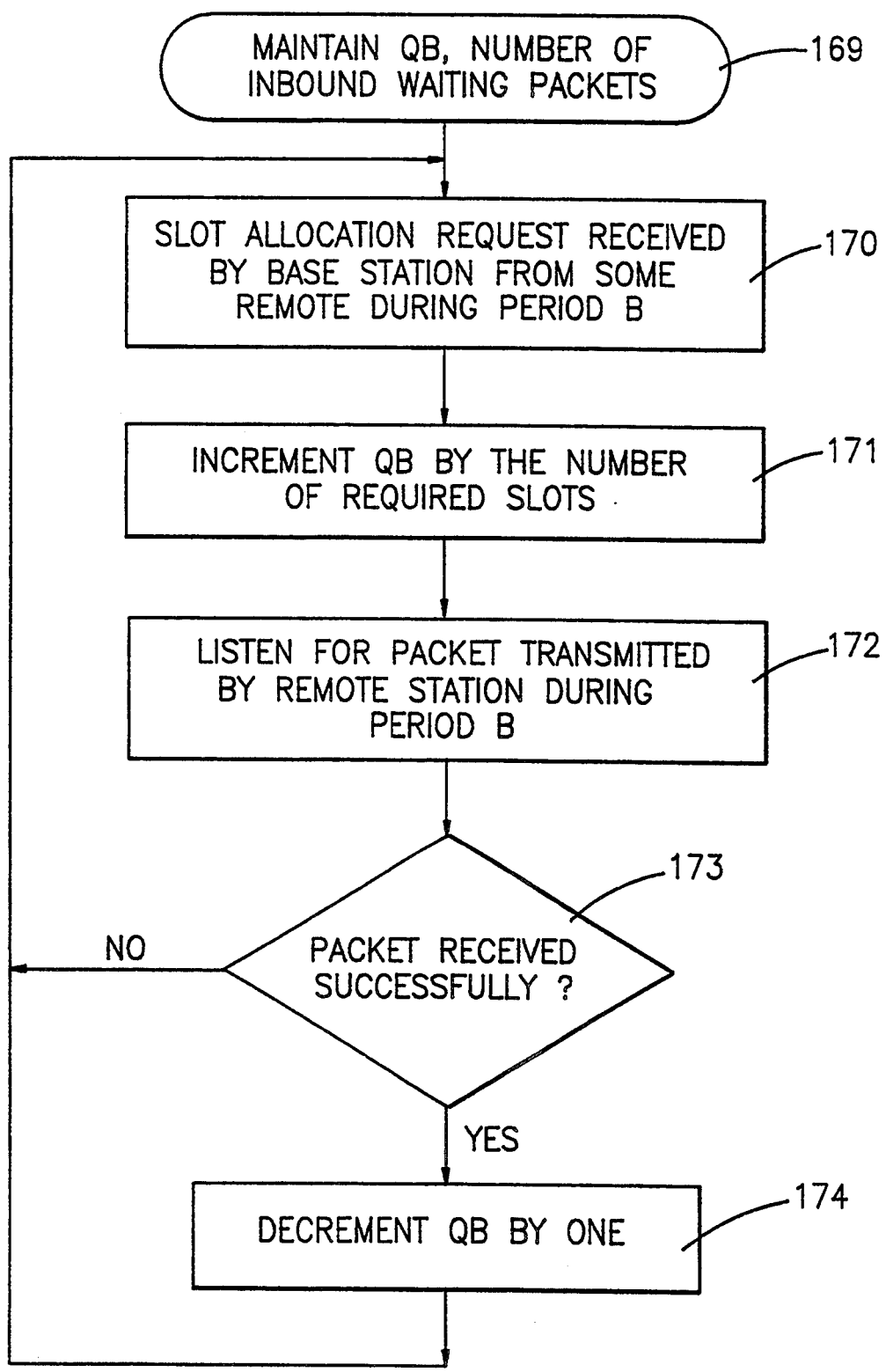
FIG. 7 is a flow chart for computing the number of outstanding packets for period B of the MAC protocol.

The method described is a centralized scheme that is run at the base station. The base station computes the lengths of the periods based on the queue lengths (traffic waiting to be transmitted in the period) for the periods A and B as shown in FIG. 6 and FIG. 7. The base station maintains the two variables QA and QB as described in detail below. As shown in FIG. 6, the base station maintains a variable QA at block 159 which represents the total number of "outbound waiting packets" to be sent in the A period. For each new outbound data message received for transmission at block 160 by the base station, QA is incremented at block 161 by the number of packets required to transmit the associated buffer. For each packet transmitted in the A period at block 162, QA is decremented by one at block 164 if the packet is successfully received by the remote station at block 163 (i.e., an acknowledgment is received). If the packet is not received successfully at block 163, the logic progression returns to block 160, as is the case following QA being decremented by one at block 164.

As shown in FIG. 7, the base station maintains a variable QB at block 169 which represents the total number of "inbound waiting packets" to be received by the base station from the remote stations in the B period. For each slot allocation request received from a remote station at block 170, QB is incremented by the number of required slots at block 171. For each packet that is transmitted in the B period at block 172, QB is decremented by one at block 174, if the packet is successfully received by the base station as determined at block 173 (i.e., an acknowledgment is received). Otherwise (e.g., if a packet is lost, that is, it is not received successfully, due to radio interference) QB is not changed. Following either event, a return is made to block 170.

The movable boundary method has two parameters that are chosen by the user: TB_MIN and TC_MIN. These values can be fixed at some nominal values or they can be varied with time as the characteristics of the traffic change. TB_MIN is defined to be the minimum length of the B period when there is at least TB_MIN traffic waiting to be received in the B period. That is, a minimum bandwidth is preserved for the inbound traffic. The number of slots in the C period is lower bounded by the value TC_MIN. These values are chosen such that TB_MIN+TC_MIN/R<TF.

Figure 8:
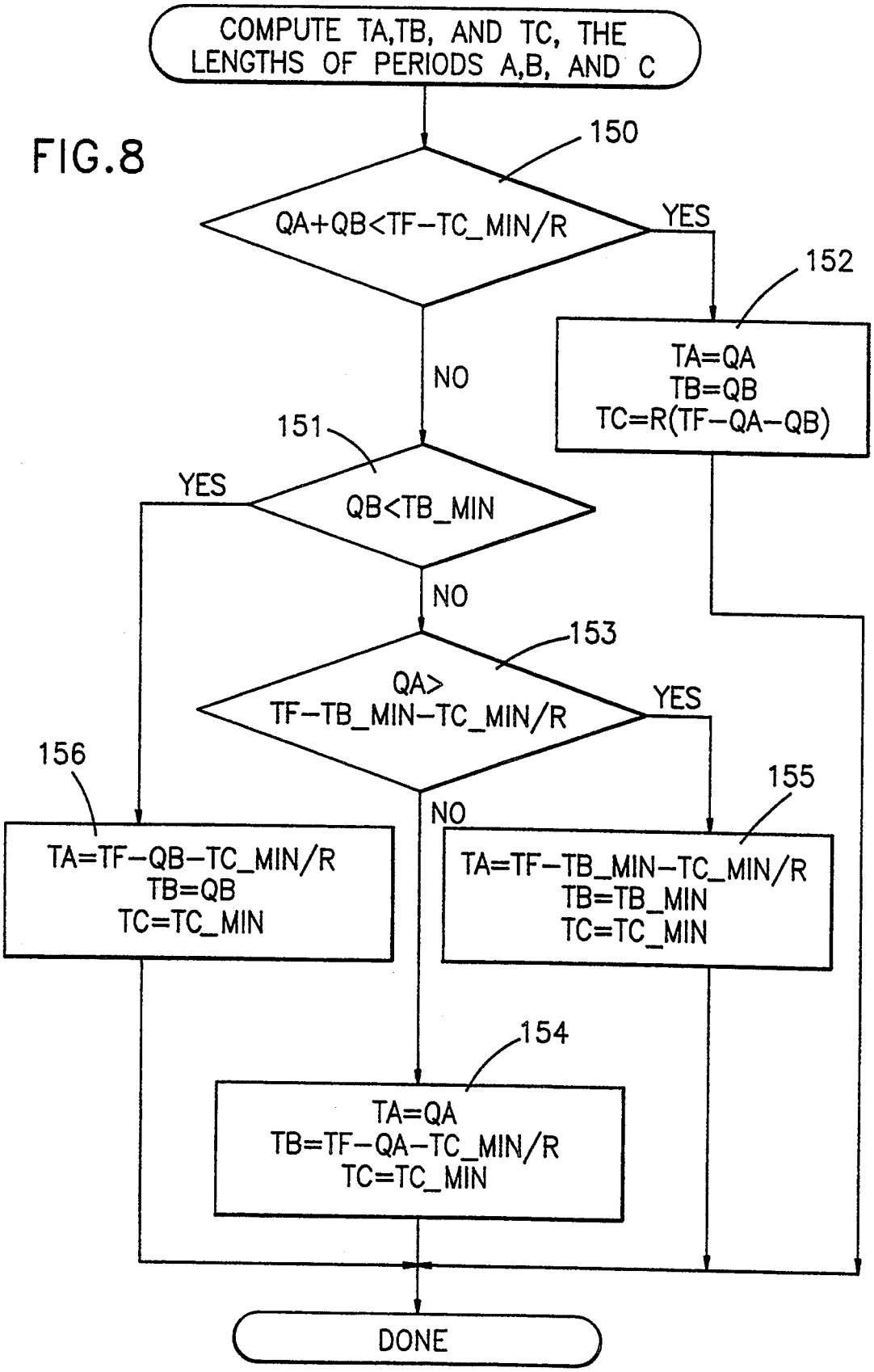
FIG. 8 is a flow chart for computing the length of periods A, B and C of the MAC protocol.

At the end of each frame (or equivalently at the beginning of a frame), TA, TB and TC are set according to the following strategy, shown in FIG. 8. The base station identifies the regime in which the variables (QA, QB) lies according to the formulas at blocks 150, 151, and 153 and computes TA, TB, and TC according to the formulas at blocks 152, 156, 155, and 154. In the absence of traffic (i.e., QA and QB are equal to zero), the frame contains an empty A period, an empty B period and a C period with TC=R×TF. This situations occurs when the base station starts broadcasting just after initialization.

To illustrate how the proposed invention reacts rapidly to traffic changes, consider the following example. Assume that there is "background" stationary traffic such that the base station receives 4 new outbound packets QA for each frame and a global request to receive 4 new inbound packets QB. Further, assume that at time i an outbound traffic peak of 16 extra packets is received by the base station. Later on, at time j, an inbound traffic peak of 16 extra packets is received by the base station. Finally at time k, a combination of inbound and outbound traffic peaks is received by the base station. Table 1 shows how the three period sizes vary with time assuming the following parameter values: TF=16, TB_MIN=2, and TC_MIN=4. For simplicity of illustration, it is assumed that R=1 in this example.

The outbound traffic peak is absorbed in 4 frames, the inbound traffic peak is absorbed in 4 frames and their combination is absorbed in 8 frames. Some techniques in the prior art rely on fixed size periods and do not allow the absorption of the traffic peak so quickly. For instance, if TA and TB are kept fixed at 6 slots, then the time required to absorb the inbound or outbound traffic peak is 8 frames (twice as long as for the movable boundary method).

TABLE 1

Illustration of period size adjustment

| Time | QA | QB | TA | TB | TC |
|---|---|---|---|---|---|
| : | : | : | : | : | : |
| i − 2 | 4 | 4 | 4 | 4 | 16 |
| i − 1 | 4 | 4 | 4 | 4 | 16 |
| i | 20 | 4 | 10 | 2 | 8 |
| i + 1 | 14 | 6 | 10 | 2 | 8 |
| i + 2 | 8 | 8 | 8 | 4 | 8 |
| i + 3 | 4 | 8 | 4 | 8 | 8 |
| i + 4 | 4 | 4 | 4 | 4 | 16 |
| : | : | : | : | : | : |
| j − 1 | 4 | 4 | 4 | 4 | 16 |
| j | 4 | 20 | 4 | 8 | 8 |
| J + 1 | 4 | 16 | 4 | 8 | 8 |
| J + 2 | 4 | 12 | 4 | 8 | 8 |
| J + 3 | 4 | 8 | 4 | 8 | 8 |
| j + 4 | 4 | 4 | 4 | 4 | 16 |
| : | : | : | : | : | : |
| k − 1 | 4 | 4 | 4 | 4 | 16 |
| k | 20 | 20 | 10 | 2 | 8 |
| k + 1 | 14 | 22 | 10 | 2 | 8 |
| k + 2 | 8 | 24 | 8 | 4 | 8 |
| k + 3 | 4 | 24 | 4 | 8 | 8 |
| k + 4 | 4 | 20 | 4 | 8 | 8 |
| k + 5 | 4 | 16 | 4 | 8 | 8 |
| k + 6 | 4 | 12 | 4 | 8 | 8 |
| k + 7 | 4 | 8 | 4 | 8 | 8 |
| k + 8 | 4 | 4 | 4 | 4 | 16 |

Estimation Method for the Number of Active Remote Stations

Using feedback information from the remote stations (i.e., the retry bit), an adaptive algorithm running at the base station is used to adjust the estimate of the number of remote stations, K, that are attempting to transmit (i.e., are active) during the C period. This parameter is used by the base station to determine the probability of transmission, p, according to the formula $K=1/p$. This choice for p can be shown to maximize throughput in a slotted Aloha system. As was described in the protocol system description, the probability p is used by the remote stations in their stochastic decision to transmit or not in a given mini-slot of the C period.

The key attributes of this method are as follows

The method is centralized at the base station. Most previously disclosed algorithms use backoff strategies in which a distributed algorithm is run at each of the remote stations.

The method uses two pieces of information to estimate K,
1. A measurement of the probability of successful transmission in a C slot. Specifically, in a frame, the ratio of the number of C slots in which a successful transmission occurs to the total number of C slots is computed.
2. A measurement of the probability that a remote station succeeds on its first attempt in a C slot given that it has succeeded. This is the ratio of the C slots in which a remote succeeds for the first time to the total number of C slots in which successful transmissions occur in the frame. The fact that the success was the first try of a remote station is communicated by a retry bit in the header of the packet that is sent from the remote to the base station.

A smoothing filter is used because of the highly varying nature of the above two measurements.

The estimate of K is updated infrequently using the same time constant as the smoothing filter.

When the base station detects that many received packets have been retried, it increases the estimated value of K (i.e., decreases the p value used by the remote stations) to decrease the number of collisions and hence increase the throughput. Alternatively, when the base station sees that only a small fraction of the packets have been retried, it decreases the value of K (i.e., increases the p value) to decrease the number of idles (i.e., slots in which no remote station attempts to transmit) and hence increase the throughput. In the described estimation algorithm, the base station increases or decreases the estimate of K by powers of 2 and $\frac{1}{2}$, respectively.

Performance analyses have shown that using the set of five K values: 2, 4, 8, 16, and 32 (equivalently, five p values corresponding to the reciprocals of the listed K values), results in little loss of performance when the number of the remote stations is less than about 45. The technique can, of course, be extended to situations in which there are a larger number of remote stations than 45 by using larger powers of two (i.e., 64, 128, etc.). The motivation for using powers of two is that such p values can be easily implemented at the remote stations using a simple Bernoulli random variable generator that is described later.

Figure 9:
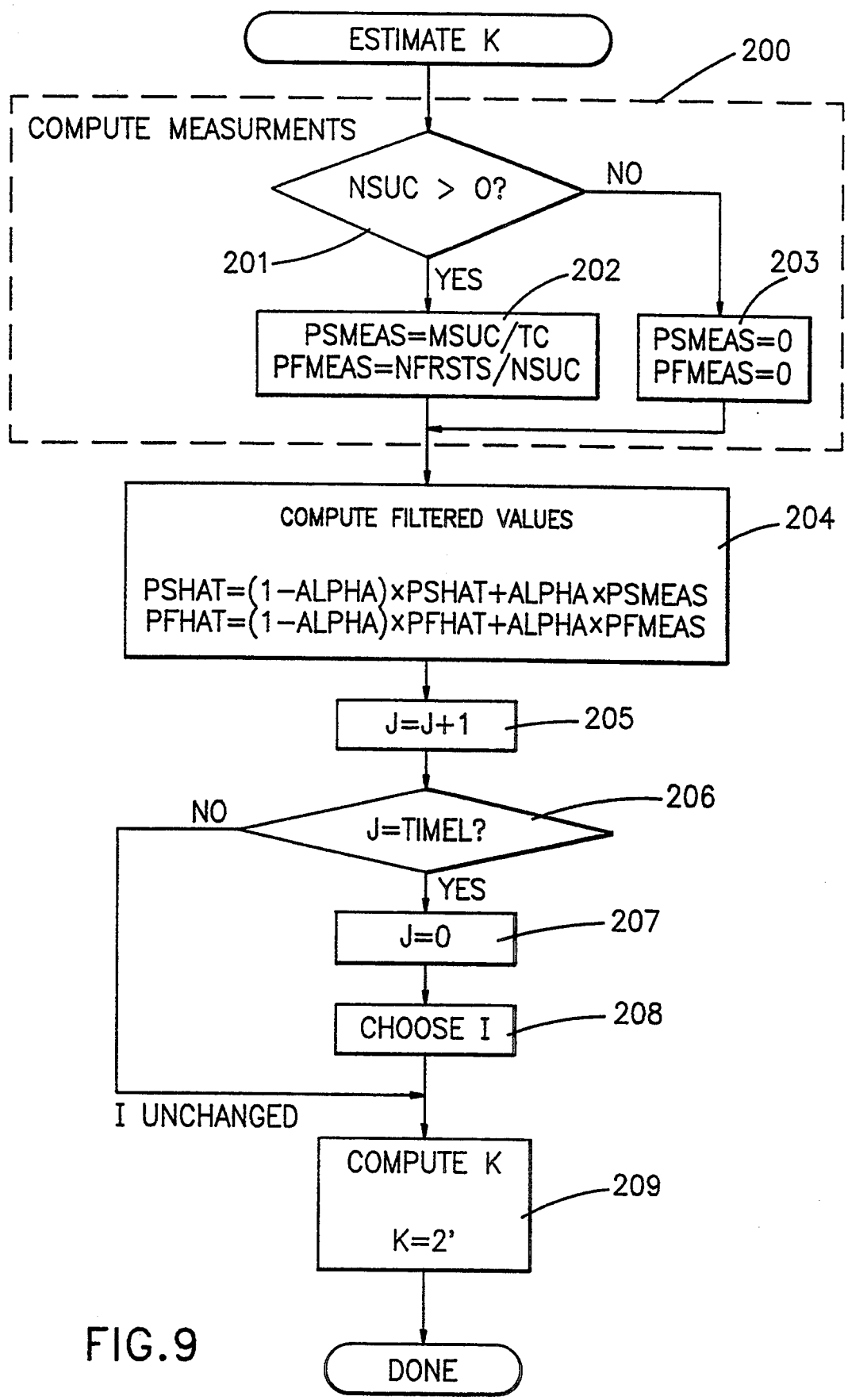
FIG. 9 is a flow chart of a method of estimating the number of remote stations that are attempting to transmit during the period C of the MAC protocol.

The K estimation method of FIG. 9 must determine which value of p to use: $\frac{1}{2}$, $\frac{1}{4}$, $\frac{1}{8}$, 1/16, or 1/32. An index, I, is used to identify which value of p=1/K is being used. Thus, I takes on values 1, . . . , 5, where p=$(\frac{1}{2})^I$ and K=$2^I$. This estimation method is executed in the base station at the end of each frame as is shown at block 108 of FIG. 4. At the beginning of the C period, the base station sets two counters to zero, a NSUC counter and a NFRSTS counter. The NSUC counter is incremented by one for each C slot that results in a successful reception of a packet by the base station. Similarly, the NFRSTS counter is incremented by one for each C slot that results in a successful packet reception in which the a retry bit is set to zero. That is, the packet header includes a control bit called the retry bit that is zero if the packet is being sent for the first time and is one if the packet has been retried one or more times. Thus, NFRSTS is the number of first packet transmissions that are successful in a given C period. These two pieces of information along with the length of the C period, TC, are used to compute two probability measures: 1) the probability of success, PSMEAS, and 2) the probability of first success, PFMEAS. As shown in block 200, PSMEAS and PFMEAS are computed. At block 201, a determination is made if NSUC is greater than zero. If so, in block 202, PSMEAS is computed according to the equation, PSMEAS=NSUC/TC. It is assumed that TC>0, but PSMEAS could be set to 0 if TC=0. Further in block 202, PFMEAS is computed by the equation, PFMEAS=NFRSTS/NSUC. If NSUC is zero at the end of the frame, then PFMEAS is set to zero. This decision to set PFMEAS to zero corresponds to an assumption of many remote stations rather than none in a situation where NSUC=0. If NSUC is not greater than zero, as tested at block 201, then PSMEAS and PFMEAS are each set equal to zero in block 203.

It has been observed that the measured values, PSMEAS and PFMEAS, vary greatly from frame to frame even when the number of active remote stations is constant. This variation requires the use of the smoothing filter in block 204 to generate more reliable measurements of the probability of success and first success. The following recursive filtering equations provide a new smoothed estimate at the end of the current frame time given the last smoothed estimate at the end of the previous frame time and the current measurement:

PSHAT=(1-ALPHA)×PSHAT+ALPHA×PSMEAS

PFHAT=(1-ALPHA)×PFHAT+ALPHA×PFMEAS

PSHAT and PFHAT are the filtered estimates of the probability of success and first success, respectively. When the base station is initialized, the values of PSHAT and PFHAT are initialized to zero.

Simulation results indicate that a value of ALPHA=$\frac{1}{8}$ yields adequate smoothing properties. This value of ALPHA corresponds to a filter time constant of 7.5 frame times. Other filtering techniques are possible including sliding windows methods. An advantage of the filtering equations shown above is that they give more weight to recent measurements than older ones whereas simple sliding window techniques treat all data in the window with equal weight.

Figure 10:
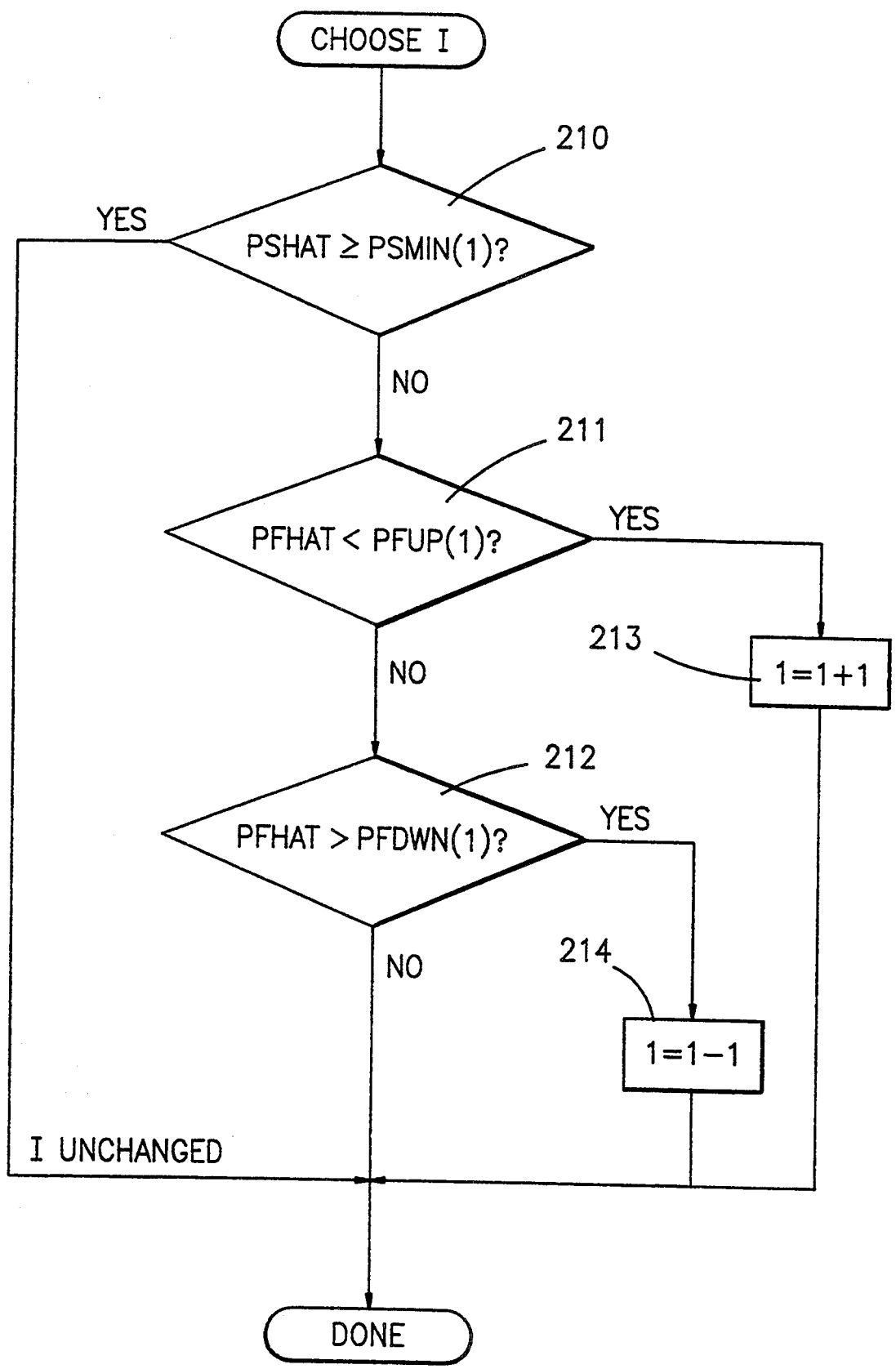
FIG. 10 is a detailed flow chart of block 208 of the flow chart of FIG. 9.

Since the required filter introduces an effective lag of about 8 time frames, the estimate of K should only be updated this often. The parameter TIMEL denotes the period of the K parameter updates in units of time frames. A good choice for TIMEL is 1/ALPHA or TIMEL=8 time frames for the proposed choice of ALPHA. Thus, the value of p=1/K is kept constant for 8 time frames during which new information is gathered for making the next estimate. If the value of TIMEL is chosen to be much smaller than 1/ALPHA, very oscillatory behavior can result. This infrequent update procedure is implemented in blocks 205, 206 and 207. When the base station is initialized, the frame counter J is initialized to zero in block 207. Thus, for the first TIMEL-1 frames, the initial I is not changed, but at the end of the TIMEL-th frame, the frame counter value J is reset and the I value is updated in block 208. The procedure that is used for choosing I in block 208 is shown in FIG. 10 where the values of the discrete functions PSMIN(I), PFUP(I), and PFDWN(I) are shown in Table 2. When the base station is initialized, the value of I is initially set to one corresponding to an initial K value of $2^I$ as shown in block 209.

Given that a certain value of I has been used in the past, the K estimation method uses the current estimates, PSHAT and PFHAT, to determine whether to use I−1, I, or I+1 for the next group of TIMEL frames according to the procedure of FIG. 10. If PSHAT≧PSMIN(I) at block 210, then no action is taken meaning that the current I value continues to be used. If PSHAT<PSMIN(I), then three possible situations occur depending on the value of PFHAT:

1. If PFHAT<PFUP(I) at block 211, then the value of I is increased by 1 at block 213 corresponding to a doubling of K.
2. If PFUP(I)≦PFHAT≦PFDWN(I) at block 212, then the value of I is not changed, and a return is made to block 210.
3. If PFDWN(I)<PFHAT in block 212, then the value of I is decreased by 1 in block 214, corresponding to a halving of K.

Analytic results have been used to compute the function values shown in Table 2. These results are based on the analysis of a slotted Aloha system with a constant number of active remote stations.

TABLE 2

| | Function values for estimation method. | | |
|---|---|---|---|
| I | PSMIN(I) | PFUP(I) | PFDWN(I) |
| 1 | 0.414 | 0.306 | 1.0 |
| 2 | 0.377 | 0.274 | 0.612 |
| 3 | 0.361 | 0.261 | 0.549 |
| 4 | 0.354 | 0.256 | 0.523 |
| 5 | 0.350 | 0.0 | 0.511 |

Note that PFDWN(1) has been set to one to indicate that I cannot be decreased below one, which corresponds to K=2. Further, PFUP(5) has been set to zero since I cannot be increased beyond 5, which corresponds to K=32.

The basic rule that is embedded in the estimation method is to use a large K corresponding to a small p in situations where the estimator has little reliable information. For example, if NSUC is zero for several frames this could be due to two situations: 1) there are no active remote stations, or 2) there are many active remote stations, but they are all colliding due to the use of too large a p value. Since the estimation method sets NFRSTS equal to zero in this situation, it is implicitly assuming that case 2 is the cause of NSUC being zero. This is the preferred behavior, since it is better to overestimate rather than underestimate the number of active remote stations. Similarly, if there are many errors due to the radio media, the K estimation method will tend to overestimate the number of active remote stations. Again, given the lack of information, this is the preferred behavior.

A brief explanation of the procedure for obtaining the values listed in Table 2 is provided. In a slotted Aloha system, it can be shown that the probability of a successful transmission occurring in a slot, PS, is given by $PS(K,p) = K \times p(1-p)^{(K-1)}$. This value and hence throughput can be maximized by using a value of $p = 1/K$ for each K value. Recall that in the method of the invention, p takes on one of the following five values: $\frac{1}{2}, \frac{1}{4}, \frac{1}{8}, 1/16$, or $1/32$, where each value corresponds to a different I value. To compute when to switch from one p value to the next, the equation for PS is used to find the values of K that yield equal values of PS for different adjacent values of p. For the five p values shown, these intersection points occur at K values of 2.71, 5.50, 11.05, and 22.14. Thus, if the number of stations is between 6 and 11, a p value of $\frac{1}{8}$ should be used to maximize PS whereas if the number of stations is between 12 and 22, a p value of 1/16 should be used. These intersection points occur at Kint(I) = $\ln(\frac{1}{2})/\ln((1-(\frac{1}{2})^I)/(1-(\frac{1}{2})^{(I+1)}))+1$ between the curves for $p=(\frac{1}{2})^I$ and $p=(\frac{1}{2})^{(I+1)}$. The value of PS at these intersection points is used to compute PSMIN(I) in Table 2 where $PSMIN(I) = PS(Kint(I), (\frac{1}{2})^I)$.

To compute the PFUP and PFDWN values in Table 2, compute the probability of a first success, PF, given that a success has occurred, which is given by $PF.((K,p), = (1-p)^{(K-1)}$ for a slotted Aloha system. Using this equation, it is found that $PFUP(I) = PF(Kint(I), (\frac{1}{2})^I)$ for I=1, 2, 3 and 4. Further, $PFDWN(I) = PF(Kint(I-1), (\frac{1}{2})^I)$ for I=2, 3, 4 and 5.

Bernoulli Random Variable Generator

Computationally efficient mechanisms are described below for generating Bernoulli random variables given a value of p. A Bernoulli random variable is 1 with probability p and 0 otherwise. The invented schemes achieve their computational simplicity by restricting the values of p to certain discrete values. A stream of random bits are generated in which the values 0 and 1 appear with equal probability. There are several known ways to approximately generate such a stream of random bits. In the approach of this invention, as shown in FIG. 11, a shift register 301 with a linear feedback mechanism is used (see block 301 of FIG. 11). During each clock cycle of the shift register, the binary sum of the indicated register bits is computed as shown by the summation points 300 and shifted into the register 301 as indicated by the arrows. The bits in the various positions of the shift register are readable for use as an address in the look-up table 302.

In this example, the taps on the shift register correspond to the use of a primitive polynomial that achieves a maximal length sequence from the shift register. In the example shown in FIG. 12, the polynomial, $y^8 + y^4 + y^3 + y^2 + y + 1$ is used. In this case, the shift register sequence does not repeat for $2^8 - 1$ or 255 clock cycles. Longer shift register lengths may be used to generate longer length sequences. When the shift register is initialized, at least one non-zero value must be loaded into a bit of the register. To prevent stations that have been started simultaneously from generating the same sequence of random bits, the shift registers of different stations can be initialized with a value that is derived from its unique equipment identification tag (e.g., the 48-bit MAC address used in the IEEE 802 standards).

Two mechanisms that use the aforementioned random bit stream for generating Bernoulli random variables are described. In the first mechanism of FIG. 11 table 302 takes i bits from the shift register 301 and can thus generate Bernoulli random variables for $p=j/2^i$, where $j=1, 2, \ldots, 2^i-1$. For example with i=5, the look-up table method can generate Bernoulli random variables for $p=1/32, 2/32, \ldots, 31/32$. An example is shown for generating the transmit signal for a p value of 5/32, which is indicated at signal line 303. In the table in block 302, the five-bit address value is determined by the five binary signals $X_1, X_2, X_3, X_4$, and $X_5$ that are obtained from the shift register 301. For each address value, the stored binary value that is used to generate the signal on line 303 is shown. Only five of the 32 equally-likely addresses are set to one to generate the transmit signal for a p value of 5/32. Note that the shift register 301 must be shifted by i bits for each Bernoulli random variable that is generated. Even greater computational simplicity can be achieved with a smaller set of p values as shown in the following mechanism.

In the second mechanism of FIG. 12, a Bernoulli random variable is generated for $p=(\frac{1}{2})^m$ with integer m, by using a logical AND operation such as gate 352 on m bits from the random bit stream. For the case that was considered in the K estimation method, m values of 1, 2, 3, 4, and 5 were used. Thus, for each C period slot, the shift register needs to be clocked by m bits (up to five).

Having thus described our invention, what we claim as new and desire to secure by Letters Patent, is:

1. In a digital data radio communication system, the combination comprising:

a plurality of remote stations, each of which includes a transceiver;

a base station having a transceiver for radio communications with the transceivers of each of said plurality of remote stations, said base station including:

means for defining a plurality of frames during which messages and data are transmitted, each of said plurality of frames being divided into three intervals, the first interval for transmission from said base station to said plurality of remote stations, the second interval for contention free transmission from said plurality of remote stations to said base station, and the third interval for contention access by said plurality of said remote stations for transmission to said base station; and means for including control indicia in a transmission from said base station to a given remote station that is indicative of the probability of said given remote station gaining access during said third interval.

2. The combination claimed in claim 1, wherein said third interval is divided into a plurality of sub-intervals in each of which a remote station may contend for access to transmit to said base station, and wherein said control indicia includes the probability of a remote station gaining access in a given sub-interval of said third interval.

3. The combination claimed in claim 2, including:
means for providing an indication in a transmission from a remote station to said base station of whether or not a given transmission of data is a retransmission.

4. The combination claimed in claim 3, including:
means for computing said control indicia as a function of said indication in a transmission from each of said remote stations in a given frame.

5. The combination claimed in claim 4, wherein said control indicia is recomputed from one frame to the next.

6. The combination claimed in claim 1, including means for changing said control indicia from one frame to the next as a function of an estimate of the number of remote stations contending for access.

7. The combination claimed in claim 6, wherein said third interval is divided into a plurality of sub-intervals in each of which a remote station may transmit to said base station, and wherein said means for changing said control indicia includes:
means for computing said control indicia as a function of the ratio of the number of sub-intervals in which a successful transmission from a remote station to the base station occurs relative to the total number of sub-intervals.

8. The combination claimed in claim 7, wherein said means for changing said control indicia includes:
means for computing said control indicia as a function of the ratio of the number of sub-intervals in which a remote station succeeds on its first attempt to transmit to the base station relative to the total number of remote stations that succeeded in an attempt to transmit to the base station within said frame.

9. The combination claimed in claim 6, wherein each of said frames are of a fixed length, including means for varying the duration of each of said three intervals as a function of the message traffic load of the system.

10. The combination claimed in claim 9, including:
means for insuring that said third interval has a predetermined minimum duration.

11. The combination claimed in claim 10, including:
means for insuring that the second interval transmission time is greater than a minimum of a predetermined threshold or transmission time for the message traffic load on the second interval, and means for insuring that the first interval transmission time has a priority in being able to reduce the second interval transmission time within each frame that exceeds said minimum of a predetermined threshold.

12. The combination claimed in claim 9, wherein each of the three intervals are divided into slots, where the slot sizes in the first and second intervals are equal in size and are referred to as regular sized slots and each accommodates one wireless data packet, and the slots in the third interval are mini-slots which are smaller by a predetermined factor than the slots in the first and second interval, with each such mini-slot accommodating one control packet.

13. The combination claimed in claim 12, wherein the number of slots in the first, second and third intervals are TA, TB and TC, respectively, and said predetermined factor is the ratio of the regular sized slots relative to the mini-slots, with this ratio being referred to as R:1.

14. The combination claimed in claim 13, including:
means for computing TA, TB and TC for a fixed frame size TF, according to the constraint:

$$TF = TA + TB + TC/R.$$

15. In a digital data radio communications system the combination comprising:
a plurality of remote stations, each of which includes a transceiver;
a base station having a transceiver for radio communications with the transceivers of each of said plurality of remote stations, said base station including:
means for defining a plurality of frames of fixed frame length, each of said frames being divided into three periods A, B and C with each period being divided into slots, including headers, with the slot sizes in the A and B periods being equal in size and being referred to as regular sized slots, and each accommodating one wireless data packet, with the slots in the C period being mini-slots which are smaller by a predetermined factor than the slots in the A and B periods, with each such mini-slot accommodating one wireless control packet, with the A period being for communications from said base station to said plurality of remote stations, the B period being for allocated communications from said plurality of remote stations to said base station, and the C period being for access by contention for communications from said remote stations to said base station;
means for varying each of the A, B and C periods as a function of message traffic load on the system; and
means for including control indicia in at least one of the A, B and C periods that is indicative of the probability of a remote station gaining access for communication to said base station in the C period, including means for changing said control indicia from one frame to the next as a function of an estimate of the number of remote stations contending for access.

16. The combination claimed in claim 15, wherein said control indicia includes the probability of a remote station gaining access in a given mini-slot in the C period.

17. The combination claimed in claim 16, including:
means for providing an indication in a transmission from a remote station to said base station of whether or not a given transmission of data is a retransmission.

18. The combination claimed in claim 17, including:
means for computing said control indicia as a function of said indication in a transmission from each of said remote stations in a given frame.

19. The combination claimed in claim 15, including:
means for computing said control indicia as a function of the ratio of mini-slots in which a successful transmission from a remote station relative to the base station occurs relative to the total number of mini-slots.

20. The combination claimed in claim 19, including:
means for computing said control indicia as a function of the ratio of the number of mini-slots in which a remote station succeeds on its first attempt to transmit to the base station relative to the total number of remote stations that succeed in an attempt to transmit to the base station within said frame.

21. The combination claimed in claim 20, including:
means for insuring that said C period has a predetermined minimal duration.

22. The combination claimed in claim 21, including:
means for insuring that said B period transmission time is greater than a minimum of a predetermined threshold or the transmission time for the message traffic load on the B period; and
means for insuring that said a period transmission time has priority in being able to reduce said B period transmission time within each frame that exceeds said minimum of a predetermined threshold.

23. The combination claimed in claim 20, wherein the number of slots in periods A, B and C are TA, TB and TC, respectively, and said predetermined factor is the ratio of the regular sized slots relative to the mini-slots, with this ratio being referred to as R:1.

24. The combination claimed in claim 23, including:
means for computing TA, TB and TC for a fixed frame size TF, according to the constraint:

$$TF = TA + TB + TC/R.$$

25. A method of operating a digital data radio communication system which includes a plurality of remote stations, each of which includes a transceiver, and a base station having a transceiver for radio communications with the transceivers of each of said plurality of remote stations, said method comprising the steps of:
defining a plurality of frames, at said base station, during which messages and data are transmitted, each of said plurality of frames being divided into three intervals, the first interval for transmission from said base station to said plurality of remote stations, the second interval for contention free transmission from said plurality of remote stations to said base station, and the third interval for contention access by said plurality of remote stations for transmission to said base station; and
including control indicia in a transmission from said base station to a given remote station that is indicative of the probability of said given remote station gaining access during said third interval.

26. The method claimed in claim 25, wherein said third interval is divided into a plurality of sub-intervals in each of which a remote station may contend for access to transmit to said base station, and wherein said control indicia includes the probability of a remote station gaining access in a given sub-interval of said third interval.

27. The method claimed in claim 26, including the step of:
providing an indication in a transmission from a remote station to said base station of whether or not a given transmission of data is a retransmission.

28. The method claimed in claim 27, including the step of:
computing said control indicia as a function of said indication in a transmission from each of said remote stations in a given frame.

29. The method claimed in claim 28, wherein said control indicia is recomputed from one frame to the next.

30. The method claimed in claim 25, including the step of:
changing said control indicia from one frame to the next as a function of an estimate of the number of remote stations contending for access.

31. The method claimed in claim 30, wherein said third interval is divided into a plurality of sub-intervals in each of which a remote station may transmit to said base station, wherein said step of changing said control indicia includes the step of:
computing said control indicia as a function of the ratio of the number of sub-intervals in which a successful transmission from a remote station to the base station occurs relative to the total number of sub-intervals.

32. The method claimed in claim 31, wherein said step of changing said control indicia includes the step of:
computing said control indicia as a function of the ratio of the number of sub-intervals in which a remote station succeeds on its first attempt to transmit to the base station relative to the total number of remote stations that succeed in an attempt to transmit to the base station within said frame.

33. The method of claim 32, wherein each of said frames are of a fixed length, including the step of:
varying the duration of each of said three intervals as a function of the message traffic load of the system.

34. The method claimed in claim 33, including the step of:
insuring that said third interval has a predetermined minimum duration.

35. The method claimed in claim 34, including the steps of:
insuring that the second interval transmission time is greater than a minimum of a predetermined threshold or the transmission time for the message traffic load on the second interval; and
insuring that the first interval transmission time has priority in being able to reduce said second interval transmission time within each frame that exceed said minimum of a predetermined threshold.

36. The method of claim 33, wherein each of the three intervals are divided into slots, where the slot sizes in the first and second intervals are equal and are referred to as regular sized slots, and each accommodates one wireless data packet, and the slots in the third interval are mini-slots which are smaller by a predetermined factor than the slots in the first and second interval, with each such mini-slot accommodating one control packet.

37. The method claimed in claim 36, wherein the number of slots in the first, second and third intervals are TA, TB and TC, respectively, and said predetermined factor is the ratio of the regular sized slots relative to the mini-slots, with this ratio being referred to as R:1.

38. The method claimed in claim 37, including the step of:
computing TA, TB and TC for a fixed frame size TF, according to the constraint:

$$TF = TA + TB + TC/R.$$

39. A method of operating a digital data radio communications system which includes a plurality of remote stations, each of which includes a transceiver, and a base station having a transceiver for radio communications with the transceivers of each of said plurality of remote stations, said method comprising the steps of:
defining a plurality of frames, at said base station, of fixed frame length, each of said frames being divided into three periods A, B and C with each period being divided into slots, including headers, with the slot sizes in the A and B periods being equal in size and being referred to as regular sized slots, and each accommodating one wireless data packet, with the slots in the C period being mini-slots which are smaller by a predetermined factor than the slots in the A and B periods, with each such mini-slot accommodating one wireless control packet, with the A period being for communications from said base station to said plurality of remote stations, the B period being for allocated communications from said plurality of remote stations to said base station, and the C period being for access by contention for communications from said remote stations to said base station;
varying the duration of each of the A, B and C periods as a function of message traffic load on the system; and
including control indicia in one of the A, B and C periods that is indicative of the probability of a remote station gaining access for communication to said base station in the C period, including means for changing said control indicia from one frame to the next as a function of the number of remote stations contending for access.

40. The method claimed in claim 39, wherein said control indicia includes the probability of a transmission by a remote station gaining access in a given mini-slot in the C period.

41. The method claimed in claim 40, including the step of:
providing an indication in a transmission from a remote station to said base station of whether or not a given transmission of data is a retransmission.

42. The method claimed in claim 41, including the step of:
computing said control indicia as a function of said indication in a transmission from each of said remote stations in a given frame.

43. The method claimed in claim 42, including the step of:
computing said control indicia as a function of the ratio of mini-slots in which a successful transmission from a remote station to the base station occurs relative to the total number of mini-slots.

44. The method claimed in claim 43, including the step of:
computing said control indicia as a function of the ratio of the number of mini-slots in which a remote station succeeds on its first attempt to transmit to the base station relative to the total number of remote stations that succeed in an attempt to transmit to the base station within said frame.

45. The method claimed in claim 44, wherein the number of slots in periods A, B and C are TA, TB and TC, respectively, and said predetermined factor is the ratio of the regular sized slots relative to the mini-slots, with the ratio being referred to as R:1.

46. The method claimed in claim 45, including the step of:
computing TA, TB and TC for a fixed frame size TF, according to the constraint:

$$TF = TA + TB + TC/R.$$

47. The method claimed in claim 45, including the step of:
insuring that said C period has a predetermined minimal duration.

48. The method claimed in claim 39, including the steps of:
insuring that said B period transmission time is greater than a minimum of a predetermined threshold or the transmission time for the message traffic load on said B period; and
insuring that said A period transmission time has priority in being able to reduce said B period transmission time within each frame that exceeds said minimum of a predetermined threshold.

49. In a digital data radio communications system the combination comprising:
a plurality of remote stations, each of which includes a transceiver;
a base station having a transceiver for radio communications with the transceivers of each of said plurality of remote stations, said base station including means for defining a plurality of frames during which information is transmitted between said plurality of remote stations and said base station, with a portion of each frame being allocated for contention access by said plurality of remote stations for transmission to said base station;
means for providing an estimation of the number of remote stations that attempt to transmit based on feedback information in transmissions from remote stations in at least a previous frame; and
means for a remote station to determine whether to transmit in a given frame as a function of said estimation.

50. In a digital data radio communications system the combination comprising:
a plurality of remote stations, each of which includes a transceiver;
a base station having a transceiver for radio communications with the transceivers of each of said plurality of remote stations, said base station including means for defining a plurality of frames during which information is transmitted between said plurality of remote stations and said base station, with a portion of each frame being allocated for contention access by said plurality of remote stations for transmission to said base station;

means for providing an indication in a transmission of information from a remote station to said base station of whether or not there has been a previous attempt to transmit this information;

means for providing an estimation of the number of remote stations that attempt to transmit based on said indication in transmissions from remote stations in at least a previous frame; and means for a remote station to determine whether to transmit in a given frame as a function of said estimation.

* * * * *